United States Patent
Saniee et al.

(10) Patent No.: US 9,104,487 B2
(45) Date of Patent: Aug. 11, 2015

(54) REDUCING RESPONSE TIME VARIANCE OF VIRTUAL PROCESSORS

(71) Applicants: Iraj Saniee, New Providence, NJ (US); Li Li, Edison, NJ (US); Eric J Bauer, Murray Hill, NJ (US); Randee S Adams, Naperville, IL (US)

(72) Inventors: Iraj Saniee, New Providence, NJ (US); Li Li, Edison, NJ (US); Eric J Bauer, Murray Hill, NJ (US); Randee S Adams, Naperville, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 182 days.

(21) Appl. No.: 13/629,693

(22) Filed: Sep. 28, 2012

(65) Prior Publication Data

US 2014/0096130 A1 Apr. 3, 2014

(51) Int. Cl.
G06F 9/455 (2006.01)
G06F 9/46 (2006.01)
G06F 9/50 (2006.01)
H04L 12/803 (2013.01)

(52) U.S. Cl.
CPC ............ G06F 9/5027 (2013.01); H04L 47/125 (2013.01)

(58) Field of Classification Search
None
See application file for complete search history.

(56) References Cited

U.S. PATENT DOCUMENTS

| | | | | |
|---|---|---|---|---|
| 7,861,174 B2* | 12/2010 | Krasnoiarov et al. | ......... | 715/736 |
| 7,881,220 B2* | 2/2011 | Huh et al. | ..................... | 370/252 |
| 8,468,196 B1* | 6/2013 | Roskind et al. | ............... | 709/203 |
| 8,516,084 B1* | 8/2013 | Grieve | .......................... | 709/219 |
| 2010/0030880 A1* | 2/2010 | Joshi et al. | ..................... | 709/223 |
| 2011/0202924 A1* | 8/2011 | Banguero et al. | ............. | 718/103 |
| 2012/0120848 A1* | 5/2012 | Hegde et al. | ................. | 370/255 |
| 2013/0332507 A1* | 12/2013 | Du et al. | ...................... | 709/203 |

OTHER PUBLICATIONS

Bailis, P. and Ghodsi, A., "Eventual Consistency Today: Limitations, Extensions, and Beyond," Communications of the ACM, vol. 56, No. 5, Mar. 1, 2013, pp. 1-13.
Dean, J. and Barroso L. A., "The Tail at Scale," Communications of the ACM, vol. 56, No. 2, Feb. 2013, pp. 74-80.

* cited by examiner

*Primary Examiner* — Diem Cao
(74) *Attorney, Agent, or Firm* — Wall & Tong, LLP (57) ABSTRACT

A capability is provided for reducing response variance of virtual processors. A controller receives a processing request. The controller may propagate the processing request toward multiple virtual processors hosted on multiple hardware devices contemporaneously. The controller may propagate the processing request toward a first virtual processor hosted on a first hardware device and propagate the processing request toward a second virtual processor hosted on a second hardware device based on a determination that a timeout period expires before a processing response is received from the first virtual processor. The timeout period may be determined based on one or more response time statistics of the virtual processor and one or more response time statistics of a physical processor.

22 Claims, 6 Drawing Sheets

REDUCING RESPONSE TIME VARIANCE OF VIRTUAL PROCESSORS

TECHNICAL FIELD

The disclosure relates generally to virtual processors and, more specifically but not exclusively, to improving response time variance of virtual processors.

BACKGROUND

The response times of a physical processor and a virtual processor to a given processing request generally vary. The amount, and causes, of variation in response times depends on a number of factors implicit in the design of the service system.

SUMMARY OF EMBODIMENTS

Various deficiencies in the prior art may be addressed by embodiments for improving response time variance of virtual processors.

In one embodiment, an apparatus includes a processor and a memory communicatively connected to the processor, where the processor is configured to propagate a processing request toward a first virtual processor hosted on a first hardware device and propagate the processing request toward a second virtual processor hosted on a second hardware device based on a determination that a timeout period expires before a processing response is received from the first virtual processor, where the timeout period is determined based on at least one response time statistic of the virtual processor and at least one response time statistic of a physical processor.

In one embodiment, a computer-readable storage medium stores instructions which, when executed by a computer, cause the computer to perform a method including propagating a processing request toward a first virtual processor hosted on a first hardware device and propagating the processing request toward a second virtual processor hosted on a second hardware device based on a determination that a timeout period expires before a processing response is received from the first virtual processor, where the timeout period is determined based on at least one response time statistic of the virtual processor and at least one response time statistic of a physical processor.

In one embodiment, a method includes using a processor for propagating a processing request toward a first virtual processor hosted on a first hardware device and propagating the processing request toward a second virtual processor hosted on a second hardware device based on a determination that a timeout period expires before a processing response is received from the first virtual processor, where the timeout period is determined based on at least one response time statistic of the virtual processor and at least one response time statistic of a physical processor.

In one embodiment, an apparatus includes a processor and a memory communicatively connected to the processor, where the processor is configured to propagate a processing request toward a first virtual processor hosted on a first hardware device and a second virtual processor hosted on a second hardware device contemporaneously.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a capability is provided for improving response time variance of virtual processors in a virtual processing environment.

Figure 1:
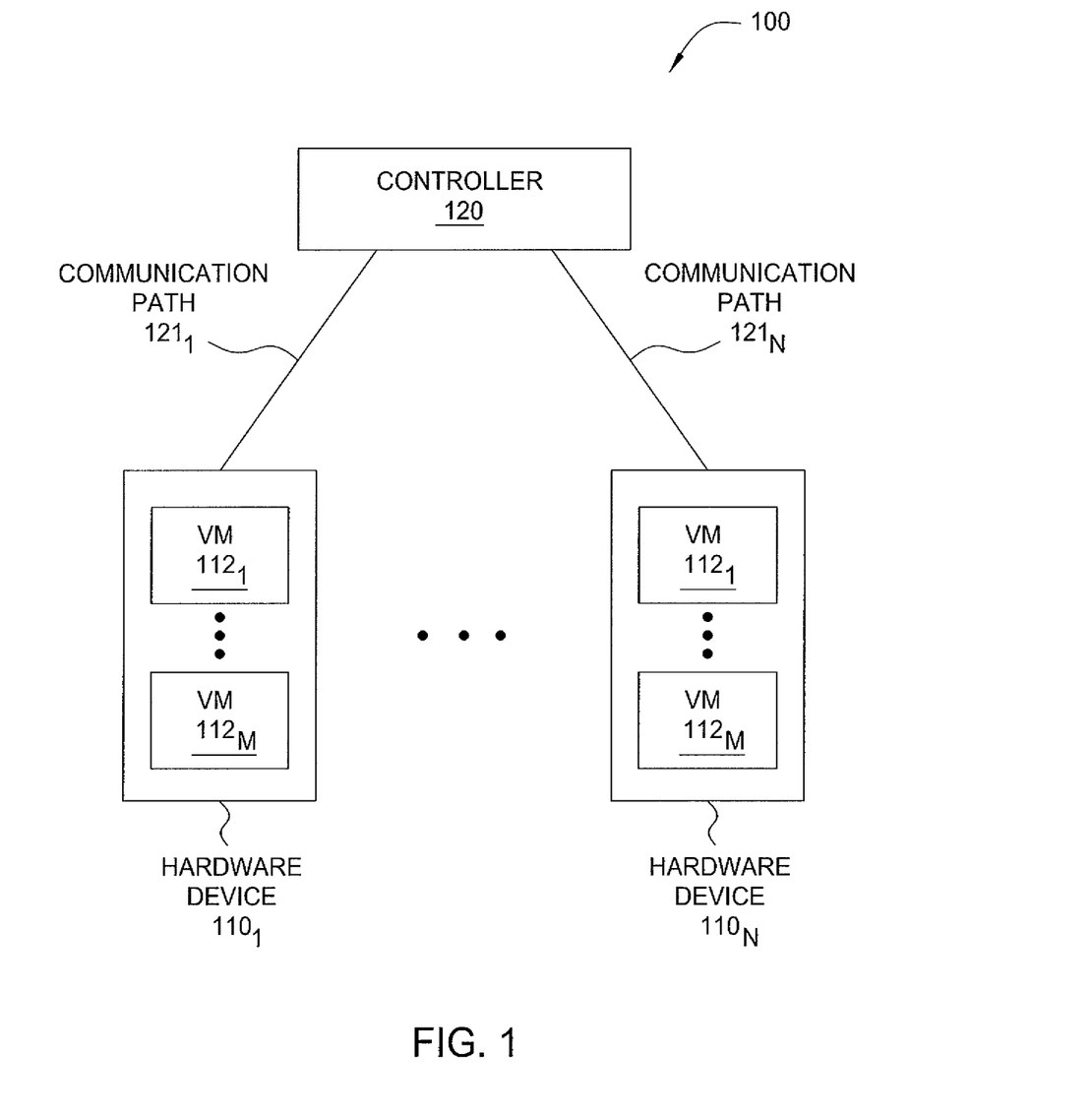
FIG. 1 depicts a high-level block diagram of a virtual processing environment configured to improve response time variance of virtual processors.

FIG. 1 depicts a high-level block diagram of a virtual processing environment configured to improve response time variance of virtual processors.

The virtual processing environment 100 is configured to support virtual processing capabilities. For example, virtual processing environment 100 may be a data center including host computers hosting virtual machines (VMs) configured to support virtual processing capabilities. For example, virtual processing environment 100 may be an Internet Protocol (IP) Multimedia Subsystem (IMS) session manager virtual server (e.g., a Proxy-Call Session Control Function (P-CSCF), a Serving-CSCF (S-CSCF), or the like),an IMS Converged Telephony Server (CTS), an IMS FSDB, a virtual signaling gateway Mobility Management Entity (MME), or the like. The virtual processing environment 100 may include any other device or group of devices supporting multiple virtual processors.

The virtual processing environment 100 includes a plurality of hardware devices $110_1$-$110_N$ (collectively, hardware devices 110), where each of the hardware devices 110 hosts a plurality of VMs $112_1$-$112_M$ (collectively, VMs 112), respectively. The various hardware devices 110 may host the same or different numbers of VMs 112 (e.g., the value of M may the same or different for different hardware devices 110). The virtual processing environment 100 also includes a controller 120 communicatively connected to each of the hardware devices 110 and, thus, to each of the VMs 112 (illustratively, via communication paths $121_1$-$121_N$ associated with hardware devices $110_1$-$110_N$).

The hardware devices 110 may include any types of hardware devices suitable for hosting VMs 112. For example, the hardware devices 110 may be central processing units (CPUs) of a server, CPUs across multiple servers, servers of a single rack, servers across multiple racks, servers across multiple locations, or the like, as well as various combinations thereof. The types of hardware devices used to host the VMs 112 may depend on the environment type of the virtual processing environment 100 and the functions supported by the virtual processing environment 100.

The VMs 112 are virtual processors configured to perform processing, including receiving processing requests, performing processing functions based on processing requests, and providing processing responses responsive to the processing requests. The types of processing performed by VMs 112 may depend on the environment type of the virtual processing environment 100 and the functions supported by the virtual processing environment 100. The typical operation of a VM 112 will be understood by one skilled in the art.

The controller 120 is configured to receive processing requests and to propagate processing requests to the VMs 112. The VMs 112 are configured to receive processing requests from controller 120, perform the processing that is indicated by the processing requests, and to return processing responses to controller 120. The processing requests and processing responses may include any suitable types of processing requests and processing responses which may be handled by a virtual processor such as a VM. It will be appreciated that the types of processing requests and processing responses supported may depend on the type of virtual processing environment and the functions supported by the virtual processing environment. For example, where the virtual processing environment 100 is a data center supporting a cloud-based file system, the processing requests may include data write requests, data read requests, data lookup requests, or the like. For example, where the virtual processing environment 100 is a CSCF, the processing requests may include user device registration requests, user device authentication requests, processing requests related to session control, or the like.

The controller 120 may be implemented in any suitable manner which, in at least some embodiments, may depend on the environment type of the virtual processing environment 100, the functions supported by the virtual processing environment 100, or the type of parallelization supported by the controller 120 for improving response time variance of virtual processing environment 100. In general, the controller 120 may be located at any suitable location from the source of the processing request to the virtual processing environment hosting virtual processors configured to handle the processing request. In at least some embodiments, as depicted in FIG. 1, the controller 120 may be implemented within the virtual processing environment (e.g., within a data center in which the hardware devices 110 and associated VMs 112 are hosted when virtual processing environment 100 is a data center, within an IMS CSCF when virtual processing environment 100 is an IMS CSCF, within a virtual signaling gateway MME when virtual processing environment is a virtual signaling gateway MME, or the like). In at least some embodiments, the controller 120 may be implemented within a network device capable of supporting communication between the source of a processing request and the associated hardware devices 110 to which the processing request may be directed. In at least some embodiments, the controller 120 may be implemented within a network device configured to initiate a processing request to be handled by the hardware devices 110 (e.g., a server, a router, a switch, or the like). In at least some embodiments, the controller 120 may be implemented within an end user device configured to initiate a processing request to be handled by the hardware devices 110 (e.g., a desktop computer, a laptop computer, a tablet computer, a smart phone, or the like). Accordingly, the communication paths 121 may include communication buses within a device, network communication paths of a network, or the like, as well as various combinations thereof. It will be appreciated that parallelization of a processing request, such that the processing request may be directed to multiple VMs 112, may be performed at any other suitable location.

The controller 120 is configured to improve the response time variance for processing requests handled by VMs 112 such that the response time variance for processing requests handled by VMs 112 tends to approach the response time variance for processing requests handled by physical processors (which also may be referred to herein as native processors).

Figure 2:
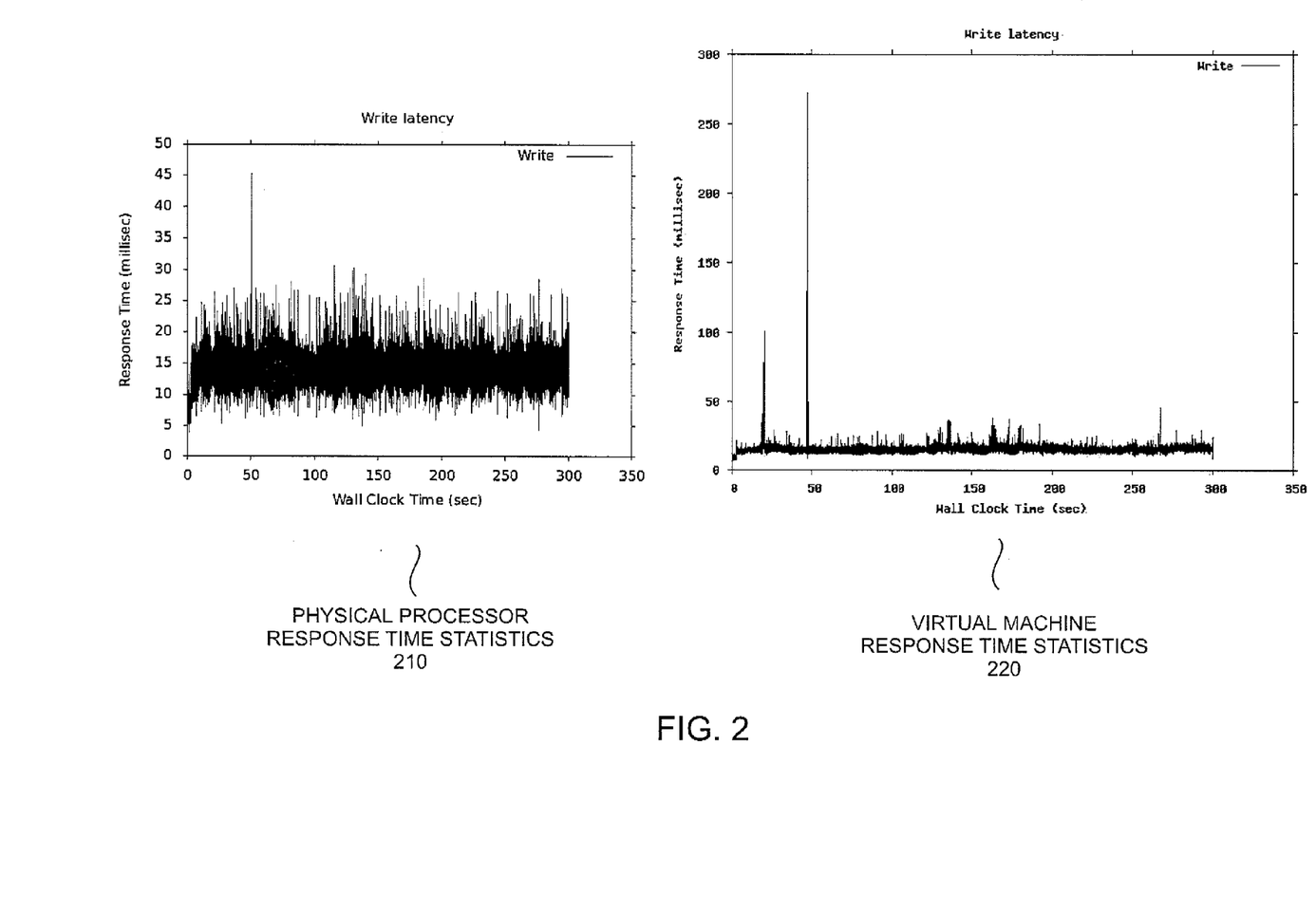
FIG. 2 depicts exemplary response time statistics for a physical processor and a virtual processor.

It will be appreciated that the response times of a physical processor and a VM to a processing request generally vary. The amount, and causes, of variation in response times depends on a number of factors implicit in the design of the service system. It is possible to directly measure response times on physical processors and VMs, and to study the associated response time variations. For example, analysis of detailed measurements of response times on physical processors and VMs for typical queries (e.g., write requests, read requests, and lookup requests) provides a clear view of the impact of processing virtualization on the tight performance requirements for many applications using such typical queries. For example, FIG. 2 depicts exemplary response time statistics for a physical processor and a virtual processor. More specifically, FIG. 2 depicts typical response time statistics of write requests on a non-SQL database that is implemented on a physical processor (illustratively, physical processor response time statistics 210) and a VM (illustratively, VM response time statistics 220). As may be seen from FIG. 2, the physical processor and the VM each have a mean response time of approximately 16 milliseconds (ms); however, while response times of the physical processor have relatively small variations around the mean response time (e.g., as in an exponential service time distribution), response times of the VM have relatively large variations around the mean response time (which is a feature typical of distributions with long or heavy tails). It is assumed that such response time measurement results are typical and repeatable for various other types of applications which may use virtual processing environments (e.g., IMS, MMEs, or the like).

It will be appreciated that, given the relatively large variations in response time for VMs, it is beneficial to characterize and analyze tail distributions of response times for VMs. For this purpose, prototypical models for low and high variance response time (namely, exponential and Pareto-like distribution families) may be used. The key statistical features of response time for typical members of the exponential and Pareto-like distribution families are summarized in Table 1. It will be appreciated that waiting time is used as the key metric in response time computation (excluding the actual service time S, because, on average, service time is a large and fairly constant portion of the total delay/response time, whereas the waiting time is only a relatively small portion). As a result, using only waiting-time is reasonable for higher percentiles, but should be used with due caution for mean and lower percentiles.

TABLE 1

| Queuing Model -- arrival rate λ, mean service time 1/μ and utilization ρ = λ/μ | Density Function Of Service Time S | Mean of Response Time W, or E(W) | Percentile of Response Time W Pr(W > x) |
|---|---|---|---|
| M/M/1 | $\mu \exp(-\mu s), s \geq 0$ | $E(W) = \dfrac{\rho \mu^{-1}}{1-\rho}$ | $\rho \exp(-\mu(1-\rho)x)$ |

TABLE 1-continued

| Queuing Model -- arrival rate λ, mean service time 1/μ and utilization ρ = λ/μ | Density Function Of Service Time S | Mean of Response Time W, or E(W) | Percentile of Response Time W Pr(W > x) |
|---|---|---|---|
| M/Pareto/1 | $\left(\frac{r-1}{r}\right)^r s^{-(1+r)}$, $s \geq (r-1)/r$ & $r \geq 2$ | $E(W) = \frac{\rho(1+C_r^2)}{2(1-\rho)}$, $C_r^2 = \frac{1}{r(r-2)}$ | not easily expressible analytically |
| M/ParetoMix/1 | pareto mixture of exponentials with tail probabilities similar to M/Pareto/1 | $E(W) = 1$ & $C_r^2 = 1 + \frac{2}{r(r-2)}$ | $\sim \frac{\rho}{2(1-\rho)x}\left(1 + \frac{\rho\log(2x) - 1}{(1-\rho)x}\right)$, $r = 2$, and more generally and asymptotically $\sim \frac{\rho}{2(1-\rho)x^{r-1}}$ |

It is generally difficult to compute tail probabilities for arbitrary response time distributions. Thus, a focus is placed here on prototypical distributions in order to estimate tail probabilities at various levels of VM utilization (e.g., exponential distribution for light tail and Pareto-type distribution for heavy tail). Using this basis, it is instructive to obtain, as reference points, samples of numerical values for the exponential and Pareto-type distributions. For example, by normalizing the mean response time to 1 unit (e.g., in ms) and setting r (the tail exponent of the cumulative response time distribution) to 4 (high variability, but with finite mean and variance) and 3 (very high variability, with finite mean and no variance), it is possible to compute mean response time, $90^{th}$ percentile response time, and $99.999^{th}$ percentile response time for each type of distribution. The results are depicted in Table 2.

TABLE 2

| Queuing Model -- arrival rate ρ, mean service time 1 (and thus ρ = λ. | mean response time | $90^{th}$ percentile response time | $99.999^{th}$ percentile response time |
|---|---|---|---|
| M/M/1, at high utilization, ρ = 0.8 | 4 ms | 10.4 ms | 56.5 ms |
| M/M/1, at low utilization, ρ = 0.2 | 0.25 ms | 0.86 ms | 12.38 ms |
| M/ParetoMix/1 with r = 4 at high utilization, ρ = 0.8 | 4.5 ms | 2.7 ms | 58.5 ms |
| M/ParetoMix/1 with r = 4 at low utilization, ρ = 0.2 | 0.28 ms | ~1.72 ms | 23 ms |
| M/ParetoMix/1 with r = 3 at high utilization, ρ = 0.8 | 3.33 ms | ~4.45 ms | ~445 ms |
| M/ParetoMix/1 with r = 3 at low utilization, ρ = 0.2 | 0.21 ms | ~1.12 ms | ~112 ms |
| M/ParetoMix/1 with r = 2 at high utilization, ρ = 0.8 | large | ~20 ms | ~200,000 ms |
| M/ParetoMix/1 with r = 2 at low utilization, ρ = 0.2 | large | ~1.25 ms | ~12,500 ms |

It may be observed from Table 2 that (1) for light-tail distribution, at 80% utilization, the $99.999^{th}$ percentile response time is about 5.5 times that of the $90^{th}$ percentile response time, whereas (2) for heavy-tailed distribution, the ratio of the $99.999^{th}$ percentile response time to the $90^{th}$ percentile response time could be significantly higher, depending on the tail exponent of the response time distribution, even at low utilization levels. As a result, if heavy tail response time is a consistent feature of VMs, then management of high percentiles of response times for VMs require one or more parameters in addition to VM utilization.

It also may be observed from Table 2 that, to the first order of approximation, the ratio of the $99.999^{th}$ percentile response time ($x_{99.999}$) to the $90^{th}$ percentile response time ($x_{90}$) may be obtained from the expression in the fourth column and fourth row of Table 1 as follows:

$$10^{-5} \approx \frac{\rho}{2(1-\rho)(x_{99.999})^{r-1}}$$

and $$10^{-1} \approx \frac{\rho}{2(1-\rho)(x_{90})^{r-1}}$$

such that $$\frac{x_{99.999}}{x_{90}} \approx 10^{4/(r-1)}$$

regardless of utilization level. Thus, for example, when r=3, the ratio of the $99.999^{th}$ percentile response time to the $90^{th}$ percentile response time is equal to approximately 100, even if the system is operated at very low utilization. Similarly, for example, in order to match the ratio of 250/16.5 observed in FIG. 2, r=3.4 may be used.

In at least some embodiments, parallelization may be used to achieve improvements in response time variance for a virtual processing environment. In at least some embodiments of parallelization, a processing request may be directed to multiple independent VMs rather than to a single VM. It will be appreciated that the probability of two independent events is a product of the probabilities of the events. Thus, if the probability of exceeding a response time is A, the probability of exceeding the response time when parallelization is used (assuming similar probability distributions for the VMs that are used) is $A^{[number\ of\ parallel\ processing\ requests]}$. For example, if the probability of exceeding a given response time is 0.001, then the probability of exceeding that response time when parallelization is used is $0.001^N$ where N is the number of independent VMs to which the processing request is directed (e.g., $1\times10^{-6}$ where the processing request is sent to two independent VMs, $1\times10^{-12}$ where the processing request is sent to three independent VMs, and so forth). The use of such parallelization ensures more reliable systems using less reliable components (although it will be appreciated that such benefits come at the expense of increased resource consumption, e.g., processing resources due to using multiple VMs to process the same processing request, bandwidth resources due to propagation of the same processing request to multiple VMs, or the like). Therefore, it will be appreciated that where a virtual processing environment operates as a black box (e.g., internal operation of the virtual processing environment is unknown or response time statistics of the virtual processing environment cannot be directly modified), parallelization on independent VMs may be used to reduce response time variance for the virtual processing performed in the virtual processing environment.

Referring back to FIG. 1, the controller 120 is configured to support parallelization of processing requests to reduce response time variance for responses to the processing requests.

In at least some embodiments, the controller 120 is configured to independently route a processing request to two or more of the VMs 112 contemporaneously.

The processor 120 receives a processing request. The processing request may be received locally (e.g., via a communication bus) or remotely (e.g., via a communication network). The processor 120 independently routes the processing request to two or more VMs 112 contemporaneously. The independence of the VMs 112 to which the processing request is routed may be based on the hardware devices 110 of the VMs 112 to which the processing request is routed (e.g., where VMs 112 on different hardware devices 110 are deemed to be independent). For example, controller 120 may propagate a received processing request to a VM 112 on hardware device $110_1$ and to a VM 112 on the hardware device $110_N$. The controller 120 receives processing responses from the two or more VMs 112 to which the processing request was routed by the controller. The controller 120 uses the first processing response that is received and ignores any later processing response(s) that is received.

The advantages of independently routing a processing request to two or more of the VMs 112 contemporaneously may be better understood by considering the exemplary information of FIG. 2. As an example, assume that controller 120 routes the processing request to three of the VMs 112 on three of the hardware devices 110, respectively. For each of the three instances of the processing request, let p be the probability of the response time of the processing request falling within a tail percentile as measured on a random VM (e.g., a response time of 250 ms for a $99.999^{th}$ percentile response time, which is approximately 16 times larger than the $90^{th}$ percentile response time on the VM, as illustrated in FIG. 2). It will be appreciated that since the response time events (e.g., receiving a processing response to the processing request within the tail percentage of interest) are independent, due to the processing request being routed to three different VMs 112 on three different hardware devices 110, the chance of the earliest processing response to the processing request being received within the tail percentage of interest would be approximately $p^3$. For example, for the case of the $99.999^{th}$ percentile response time as specified in FIG. 2, the chance of the earliest processing response to the processing request being received within the $99.999^{th}$ percentile response time would be $(10^{-5})^3=10^{-15}$ (i.e., an exceptionally rare event). For a given processing request, it may be shown analytically that, by sending the processing request to multiple VMs 112, the response time variance can be reduced arbitrarily even for a relatively poor response time distribution associated with sending the processing request to a single VM 112. It will be appreciated that use of multiple VMs 112 to reduce response time variance reduces the utilization of the VMs 112, because a processing request consumes processing resources of multiple VMs 112 when processing resources of only one VM 112 are needed in order to obtain the associated processing response for the processing request.

Figure 3:
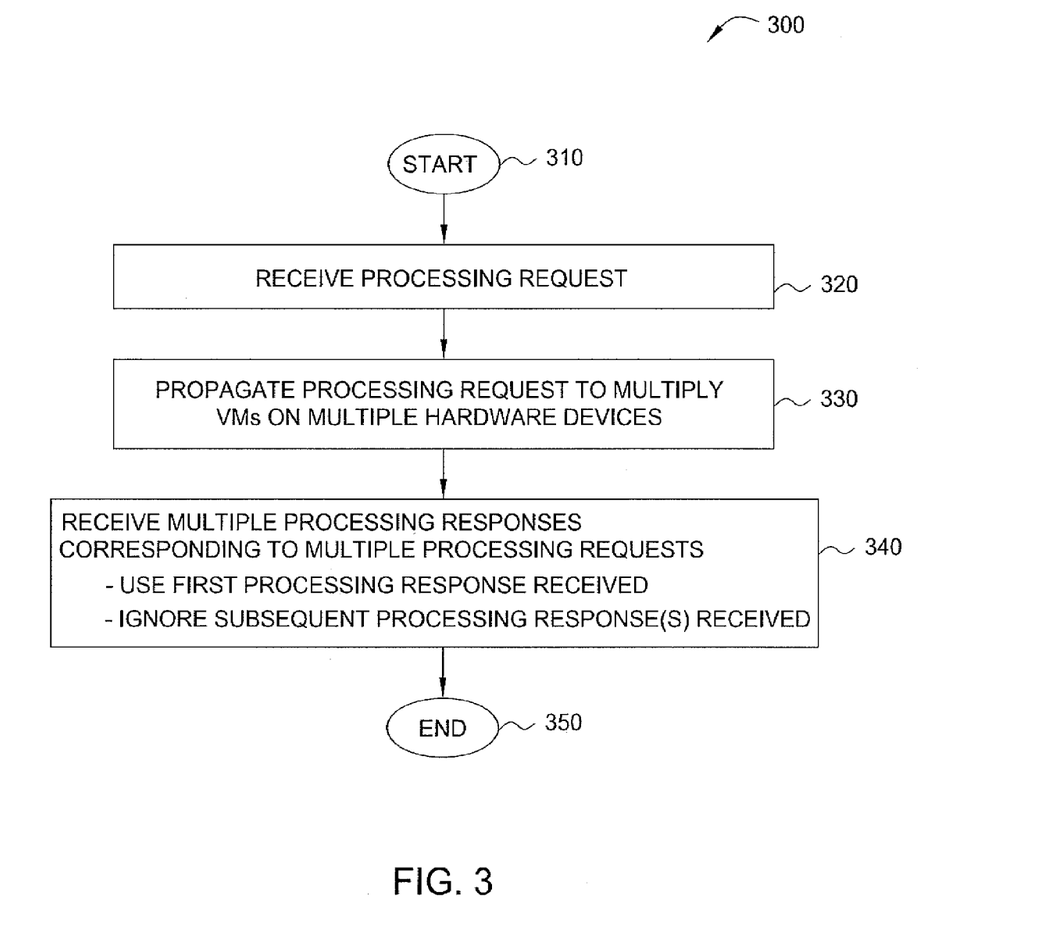
FIG. 3 depicts one embodiment of a method for using parallelization to improve response time variance of a virtual processor.

FIG. 3 depicts one embodiment of a method for using parallelization to improve response time variance of a virtual processor.

At step 310, method 300 begins.

At step 320, a processing request is received.

At step 330, the processing request is propagated to multiple VMs hosted on multiple hardware devices.

At step 340, processing responses corresponding to the processing requests are received. The first processing response that is received is used (e.g., processed, propagated toward one or more elements, or the like). The subsequent processing response(s) that is received is ignored.

At step 350, method 300 ends.

In at least some embodiments, controller 120 is configured to provide a form of parallelization that is more efficient than propagating the processing request to multiple VMs 112 contemporaneously.

In at least some embodiments, controller 120 is configured to receive a processing request, propagate the processing request to a first VM 112 hosted on a first hardware device 110, and, based on a determination that a response from the first VM 112 hosted on the first hardware device 110 is not received within a timeout period, propagate the processing request to a second VM 112 hosted on a second hardware device 110.

In at least some embodiments, the controller 120 is configured to determine the timeout period for the processing request. The controller 120 may be configured to determine the timeout period for the processing request by retrieving the timeout period from memory, computing the timeout period, requesting the timeout period from a device configured to compute the timeout period, or the like. The timeout period may be computed in a number of ways.

In at least some embodiments, the timeout period is computed based on physical processor response time statistics (or statistical analysis) associated with a physical processor(s) and virtual processor response time statistics (or statistical analysis) associated with a virtual processor(s) (e.g., VM 112).

In at least some embodiments, the physical processor on which the physical processor response time statistics may be based may be a physical processor in general (e.g., any type of physical processor), a physical processor that is representative of the virtual processor (e.g., representative in terms of the type of application to be supported, the application to be supported, the type of functions to be performed, the functions to be performed, or the like), or the like, as well as various combinations thereof. The physical processor response time statistics may be determined from measurements obtained from one or more physical processors in operation in one or more environments, from one or more physical processors deployed and operated within a test environment for purposes of obtaining physical processor statistics, or the like, as well as various combinations thereof.

In at least some embodiments, physical processor response time statistics are determined for multiple response time percentiles of interest at multiple utilization levels of interest. For example, the utilization levels of interest may include utilization levels from 5% to 95% in 5% increments, utilization levels from 80% to 98% in 2% increments, or the like. For example, the response time percentiles of interest may include $90^{th}$ percentile response times and one or more other response time percentiles of interest (e.g., the mean response time and the $99.999^{th}$ response time percentile), the response time percentiles of interest may include $85^{th}$ percentile response times and one or more other response time percentiles of interest (e.g., the $90^{th}$ response time percentile, the $99.99^{th}$ response time percentile, and the $99.999^{th}$ response time percentile), or the like. An exemplary set of physical processor response time statistics is depicted in Table 3.

TABLE 3

| Utilization | mean response time | $90^{th}$ percentile | $99.999^{th}$ percentile |
|---|---|---|---|
| 10% | 20 ms | 30 ms | 80 ms |
| 75% | 50 ms | 80 ms | 200 ms |
| 90% | 60 ms | 150 ms | 600 ms |

As illustrated in Table 3, the exemplary set of physical processor response time statistics includes statistics for three utilization levels of interest (namely, 10%, 75%, and 90%) and three response time percentiles of interest (namely, mean response time, $90^{th}$ response time percentile, and $99.999^{th}$ response time percentile). At 10% utilization, the mean response time for receipt of processing responses is 20 ms, 90% of the processing responses are received within 30 ms, and 99.999% of the processing responses are received within 80 ms. At 75% utilization, the mean response time for receipt of processing responses is 50 ms, 90% of the processing responses are received within 80 ms, and 99.999% of the processing responses are received within 200 ms. At 90% utilization, the mean response time for receipt of processing responses is 60 ms, 90% of the processing responses are received within 150 ms, and 99.999% of the processing responses are received within 600 ms.

The physical processor response time statistics are used to determine the timeout period for the virtual processor. It will be appreciated that one or more sets of physical processor response time statistics may be used to determine timeout periods for one or more virtual processors (e.g., a single set of physical processor response time statistics may be used for each of the VMs 112, N sets of physical processor response time statistics may be used for VMs 112 disposed on the N respective hardware devices 110, multiple sets of physical processor response time statistics may be available for use for different ones of the VMs 112 (e.g., where one of the sets of physical processor response time statistics is selected for a given VM 112 based on a level of similarity between the given VM 112 and the physical processor(s) for which the one of the sets of physical processor response time statistics was determined), or the like, as well as various combinations thereof).

In at least some embodiments, the virtual processor on which the virtual processor response time statistics may be based may be a virtual processor in general, a virtual processor that is representative of the virtual processor for which the timeout period is determined, or the like. The virtual processor response time statistics may be determined from measurements obtained from one or more virtual processors in operation in one or more environments, from one or more virtual processors deployed and operated within a test environment for purposes of obtaining virtual processor statistics, or the like, as well as various combinations thereof. The virtual processor response time statistics may be specific to the specific virtual processor to which the processing request is first routed (e.g., where processor statistics for the specific virtual processor are collected and maintained over time).

In at least some embodiments, the timeout period is determined based on a pair of factors (denoted as factor F1 and factor F2) and a utilization level of interest.

The factor F1 is determined based on response time statistics of a physical processor. The factor F1 may be based on a first response time statistic for a first response time percentile (e.g., the $99.99^{th}$ percentile, the $99.999^{th}$ percentile, or the like) and a second response time statistic for a second response time percentile (e.g., the $90^{th}$ percentile, the $95^{th}$ percentile, or the like) at a utilization level of interest. In one embodiment, the second response time percentile is the $90^{th}$ percentile. The factor F1 may be computed as a ratio of a first response time statistic for a first response time percentile (e.g., the $99.99^{th}$ percentile, the $99.999^{th}$ percentile, or the like) to a second response time statistic for a second response time percentile (e.g., the $90^{th}$ percentile, the $95^{th}$ percentile, or the like) at a utilization level of interest. For example, for the physical processor response time statistics 210 FIG. 2, factor F1 is approximately 15 for the ratio of the response time of the $99.999^{th}$ response time percentile to the response time of the $90^{th}$ response time percentile. For example, for the physical processor response time statistics of Table 3, factor F1 is approximately 2.5 at 75% utilization using the $99.999^{th}$ percentile response time and the $90^{th}$ percentile response time (e.g., 200 ms at $99.999^{th}$ percentile/80 ms at $90^{th}$ percentile=2.5).

The factor F2 is determined based on factor F1 and virtual processor response time statistics (e.g., response time statistics associated with the first VM 112 to which the processing request is first routed). The factor F2 is less than or equal to the factor F1. For example, for the physical processor of FIG. 2 for which factor F1 is approximately 15, factor F2 may be any value less than or equal to 15. Similarly, for example, for the physical processor for which the percentile response time statistics of Table 3 are specified and for which factor F1 is approximately 2.5, factor F2 may be any value less than or equal to 2.5. The factor F2 may be based on one or more of an operator policy regarding response time tail probabilities, a service level agreement, information indicative as to how closely the virtual processor is to mimic the tail percentiles (statistics) of the associated physical processor(s) used as a basis for controlling the virtual processor, or the like, as well as various combinations thereof.

The timeout period is determined based on factor F2 and the physical processor response time statistics. The timeout period may be computed as a product of the value of factor F2 and the second response time statistic for a second response time percentile (e.g., the $90^{th}$ percentile response time). For example, the timeout period may be computed as follows: timeout period=$F2 \times X_{90}$, where $X_{90}$ is the $90^{th}$ percentile response time. In at least some embodiments, the timeout period may be computed as the value at which the probability that the response time will exceed the value of the percentile response time of interest (e.g., the $99.999^{th}$ percentile value) given that the response time has already exceeded the timeout value is larger than the probability that the response time will be smaller than the percentile response time of interest (e.g., again, the $99.999^{th}$ percentile value).

The computation and use of the timeout period may be better understood by way of the following example. As noted above, for a utilization of 75% and response time percentiles of 99.999% and 90%, factor F1 is computed to be F1=2.5. Then, assuming that factor F2 is determined to be F2=2, the timeout period is computed as follows: timeout=$F2 \times X_{90}$=$2 \times$ 80 ms (at 75% utilization, upon which factor F1 was based)= 160 ms. In this example, the controller 120, based on a determination that a response is not received from the first VM 112 within 160 ms after the processing request is routed to the first VM 112, routes the processing request to the second VM 112.

Figure 4:
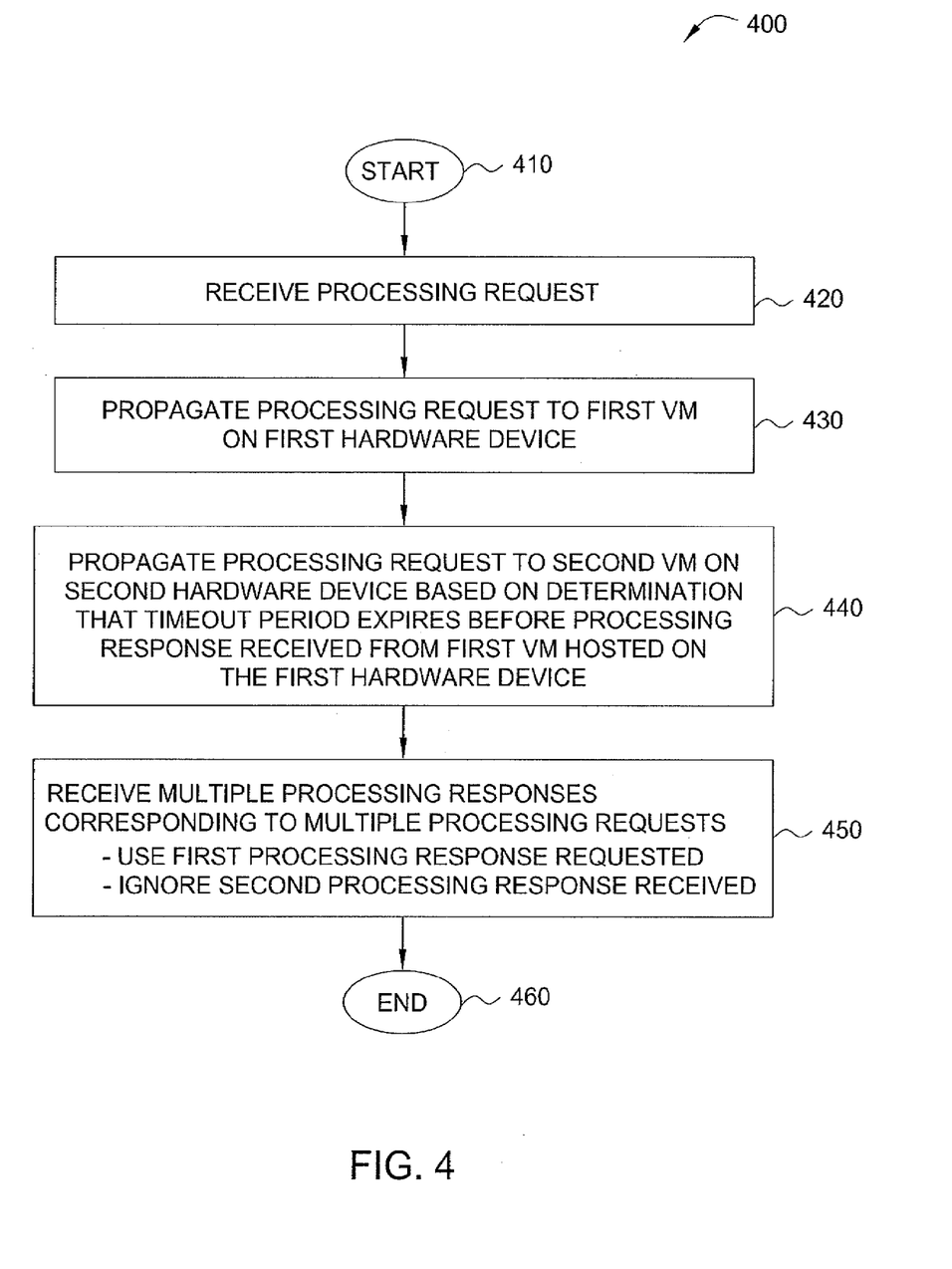
FIG. 4 depicts one embodiment of a method for using parallelization to improve response time variance of a virtual processor.

FIG. 4 depicts one embodiment of a method for using parallelization to improve response time variance of a virtual processor.

At step 410, method 400 begins.

At step 420, a processing request is received.

At step 430, the processing request is propagated to a first VM hosted on a first hardware device.

At step 440, the processing request is propagated to a second VM hosted on a second hardware device based on a determination that a timeout period expires before a processing response is received from the first VM hosted on the first hardware device. The timeout period may be determined as depicted and described with respect to FIG. 1 and FIG. 5.

At step 450, processing responses corresponding to the processing requests are received. The first processing response that is received is used (e.g., processed, propagated toward one or more elements, or the like). The second processing response that is received is ignored.

At step 460, method 400 ends.

Figure 5:
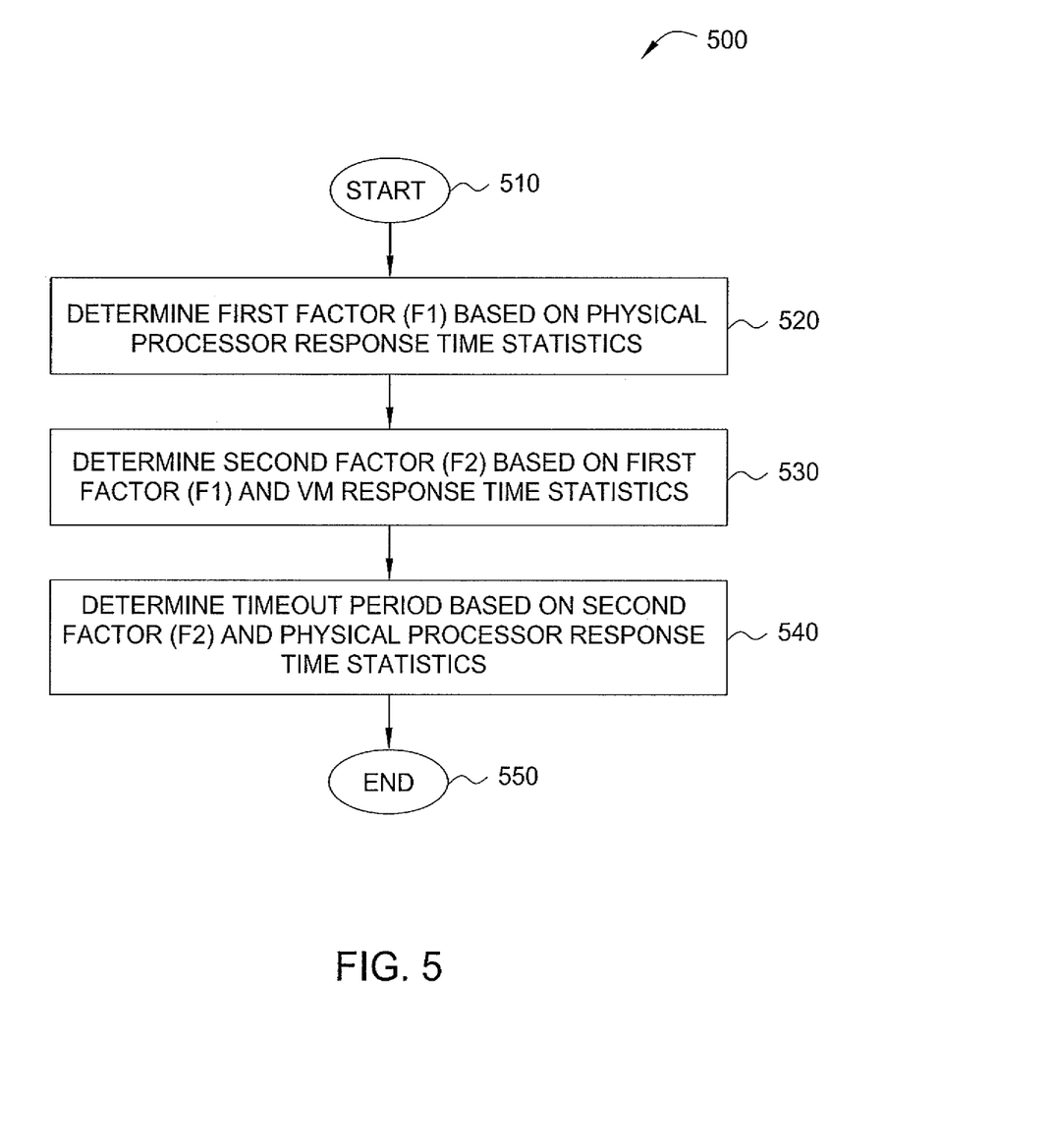
FIG. 5 depicts one embodiment of a method for determining a timeout period for use in the method of FIG. 4.

FIG. 5 depicts one embodiment of a method for determining a timeout period for use in the method of FIG. 4.

At step 510, method 500 begins.

At step 520, a first factor (denoted herein as F1) is determined. The first factor is determined based on response time statistics of a physical processor. The response time statistics of the physical processor include, for a utilization level of interest, a first response time statistic associated with a first response time percentile and a second response time statistic associated with a second response time percentile, where the first response time percentile is less than the second response time percentile. The first factor may be computed as a ratio of the first response time statistic associated with the first response time percentile to the second response time statistic associated with the second response time percentile for a given utilization level of interest.

At step 530, a second factor (denoted as F2) is determined. The second factor is determined based on the first factor and response time statistics of a VM. The second factor is set to be less than the first factor. The second factor may be set based on one or more of an operator policy regarding response time tail probabilities, a service level agreement, information indicative as to how closely the virtual processor is to mimic the tail percentiles (statistics) of the associated physical processor(s) used as a basis for controlling the virtual processor, or the like, as well as various combinations thereof.

At step 540, the timeout period is determined based on the second factor and the response time statistics of a physical processor. For example, the timeout period may be computed as a product of the second factor and the second response time statistic.

At step 550, method 500 ends.

It will be appreciated that, although primarily depicted and described with respect to embodiments in which a single set of physical processor response time statistics is available for use in determining the timeout period for a VM 112, in at least some embodiments multiple sets of physical processor response time statistics may be available for use in determining the timeout period for a VM 112. In at least some such embodiments, one or more of the sets of physical processor response time statistics may be used to determine the timeout period for a VM 112. In at least some embodiments, the controller 120 may select one of the multiple sets of physical processor response time statistics to be used to determine the timeout period for a VM 112. For example, controller 120 may select a set of physical processor response time statistics for a physical processor based on one one or more characteristics of the VM 112 for which the timeout period is determined (e.g., selecting a set of physical processor response time statistics for a physical processor configured to support an application similar to an application to be supported by the VM 112 for which the timeout period is determined, selecting a set of physical processor response time statistics for a physical processor configured to perform functions similar to functions performed by the VM 112 for which the timeout period is determined, or the like). It will be appreciated that various other characteristics may be used to select a set of physical processor response time statistic that is representative of response time statistics expected for the VM 112 for which the timeout period is determined. It will be appreciated that one or more sets of physical processor response time statistics may be used to determine timeout periods for one or more VMs 112 (e.g., the same set of physical processor response time statistics may be used for each of the VMs 112, N different sets of physical processor response time statistics may be used for VMs 112 disposed on the N respective hardware devices 110, multiple sets of physical processor response time statistics may be available for use for different ones of the VMs 112 (e.g., where one of the sets of physical processor response time statistics is selected for a given VM 112 based on a level of similarity between the given VM 112 and the physical processor(s) for which the one of the sets of physical processor response time statistics was determined), or the like, as well as various combinations thereof).

Referring back to FIG. 1, it will be appreciated that the selection of the VM(s) 112 to which an additional processing request(s) is sent may or may not be constrained. In at least some embodiments, none of the VMs 112 of the virtual processing environment 100 are dedicated for use in handling additional processing requests resulting from use of parallelization (e.g., the additional contemporaneous or subsequent processing requests may be directed to any of the VMs 112 as long as the VMs 112 for a given processing request are hosted on different hardware devices 110). In at least some embodiments, one or more VMs 112 of the virtual processing environment 100 may be dedicated for use in handling additional processing requests resulting from use of parallelization. For example, one or more VMs 112 on each of the hardware devices 110 may be dedicated for use in handling additional processing requests resulting from use of parallelization. For example, all of the VMs on a selected one of the hardware devices 110 may be dedicated for use in handling additional processing requests resulting from use of parallelization (e.g., that hardware device is dedicated for use in handling additional processing requests resulting from use of parallelization). For example, one or more VMs on one or more of the hardware devices 110 may be dedicated for use in handling additional processing requests resulting from use of parallelization. In at least some embodiments in which one or more dedicated VMs 112 are to be used to handle additional processing requests resulting from use of parallelization, the number of dedicated VMs 112 to be dedicated for use in handling additional processing requests resulting from use of parallelization may be determined by estimating the number of additional processing requests to be handled and then determining the number of standby VMs 112 based on the estimated number of subsequent processing requests to be handled. As noted above, the dedicated VM(s) 112 may be instantiated on one or more hardware devices 110 (e.g., in the case of multiple standby VMs 112, the multiple dedicated VMs 112 may be instantiated on a single hardware device 110 dedicated for use for dedicated VMs, may be distributed across multiple hardware devices 110, or the like). It will be appreciated that, although primarily depicted and described with respect to embodiments in which the virtual processing environment is assumed to be idempotent when handling multiple concurrent processing requests, in at least some embodiments (e.g., for at least some types of applications) the virtual processing environment will not be idempotent when handling multiple concurrent processing requests. In at least some such embodiments in which the virtual processing environment will not be idempotent when handling multiple concurrent processing requests, the controller 120 may be configured to abort a first processing request before a second processing request is initiated or after a first processing response associated with the first processing request is received. It will be appreciated that if aborting a processing request takes a non-negligible amount of time, the time taken to abort the processing request may be taken into account.

It will be appreciated that, although primarily depicted and described with respect to embodiments in which the processing requests are assumed to be of uniform size, in at least some embodiments the processing requests will not be of uniform size. In at least some such embodiments in which processing request sizes are non-uniform, the controller 120 may be configured to handle the response time statistics using processing request size categories.

It will be appreciated that, although primarily depicted and described herein with respect to use of parallelization of processing requests to reduce response time variance of specific types of virtual processors (namely, VMs), parallelization of processing requests to reduce response time variance of any other suitable type(s) of virtual processors.

It will be appreciated that, although primarily depicted and described herein with respect to use of parallelization of processing requests to reduce response time variance of virtual processors within a specific type virtual processing environment, parallelization of processing requests to reduce response time variance of virtual processors may be used within various other types of virtual processing environments.

Figure 6:
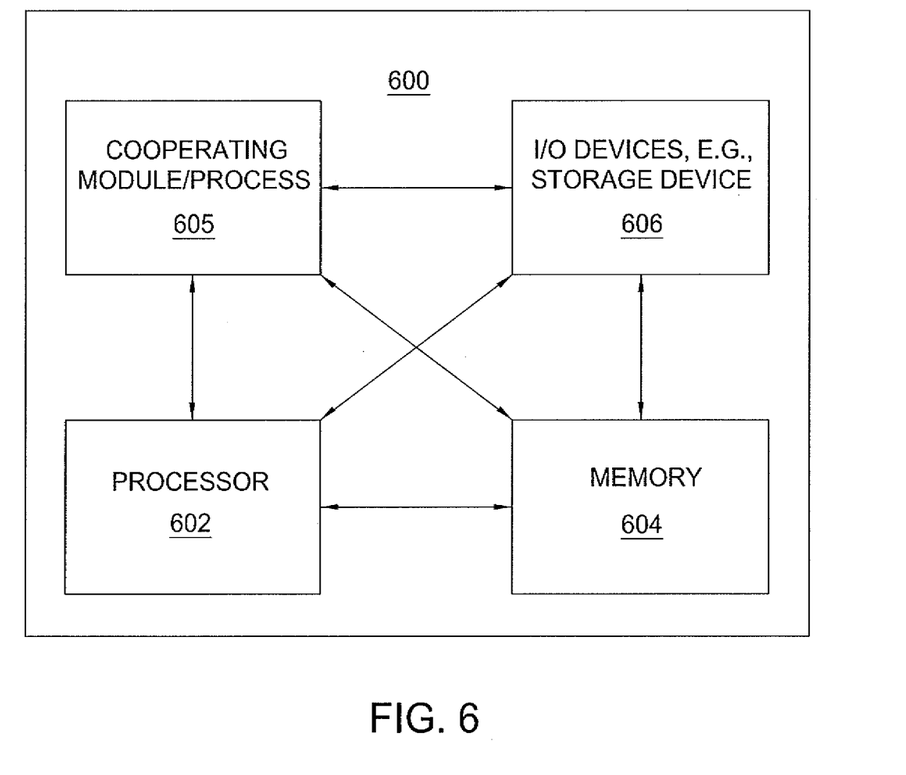
FIG. 6 depicts a high-level block diagram of a computer suitable for use in performing functions described herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., random access memory (RAM), read only memory (ROM), and the like).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, and the like.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 600 depicted in FIG. 6 provides a general architecture and functionality suitable for implementing functional elements described herein or portions of functional elements described herein. For example, the computer 600 provides a general architecture and functionality suitable for implementing one or more of a hardware device 110, a portion of a hardware device 110, controller 120, or the like.

It will be appreciated that the functions depicted and described herein may be implemented in software (e.g., via implementation of software on one or more hardware processors, for executing on a general purpose computer (e.g., via execution by one or more processors) so as to implement a special purpose computer, and the like) or may be implemented in hardware (e.g., using a general purpose computer, one or more application specific integrated circuits (ASIC), and/or any other hardware equivalents).

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or," unless otherwise indicated (e.g., "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a processor and a memory communicatively connected to the processor, the processor configured to:
        propagate a processing request toward a first virtual processor hosted on a first hardware device; and
        propagate the processing request toward a second virtual processor hosted on a second hardware device based on a determination that a timeout period associated with the first virtual processor expires before receipt of a first processing response from the first virtual processor responsive to the processing request, wherein the timeout period is based on at least one physical processor response time statistic, wherein the at least one physical processor response time statistic is associated with a physical processor that is representative of the first virtual processor.

2. The apparatus of claim 1, wherein the processor is configured to:
    receive at least one of the first processing response from the first virtual processor responsive to the processing request or a second processing response from the second virtual processor responsive to the processing request; and
    use an earlier received of the first processing response from the first virtual processor responsive to the processing request and the second processing response from the second virtual processor responsive to the processing request.

3. The apparatus of claim 1, wherein the processor is configured to:
    use a second processing response received from the second virtual processor responsive to the processing request based on a determination that the second processing response from the second virtual processor responsive to the processing request is received prior to receipt of the first processing response from the first virtual processor responsive to the processing request.

4. The apparatus of claim 1, wherein the processor is configured to:
use the first processing response received from the first virtual processor responsive to the processing request based on a determination that the first processing response from the first virtual processor responsive to the processing request is received prior to receipt of a second processing response from the second virtual processor responsive to the processing request.

5. The apparatus of claim 1, wherein the timeout period is based on at least one response time statistic of the first virtual processor.

6. The apparatus of claim 5, wherein the timeout period is determined based on a first factor and a second factor.

7. The apparatus of claim 6, wherein the first factor is based on the at least one physical processor response time statistic.

8. The apparatus of claim 7, wherein the at least one physical processor response time statistic is associated with a processor utilization level of the physical processor that is representative of the first virtual processor.

9. The apparatus of claim 7, wherein the second factor is based on the first factor and the at least one response time statistic of the first virtual processor.

10. The apparatus of claim 6, wherein the second factor is less than the first factor.

11. The apparatus of claim 6, wherein the second factor is based on at least one of an operator policy regarding a response time tail probability, a service level agreement, or information indicative as to how closely the first virtual processor is to mimic a tail percentile of the physical processor that is representative of the first virtual processor.

12. The apparatus of claim 5, wherein the at least one physical processor response time statistic comprises a first response time statistic associated with a first response time percentile and a second response time statistic associated with a second response time percentile.

13. The apparatus of claim 12, wherein the first response time percentile is greater than 90% and the second response time percentile is equal to or about equal to 90%.

14. The apparatus of claim 12, wherein the processor is configured to determine the timeout period by:
computing a first factor based on the first response time statistic associated with the first response time percentile and the second response time statistic associated with the second response time percentile, wherein the first response time percentile is less than the second response time percentile;
computing a second factor based on the first factor and the at least one response time statistic of the first virtual processor; and
computing the timeout period based on the second factor and the second response time statistic.

15. The apparatus of claim 14, wherein the first factor is computed as a ratio of the first response time statistic associated with the first response time percentile and the second response time statistic associated with the second response time percentile.

16. The apparatus of claim 14, wherein the first response time statistic and the second response time statistic are associated with a processor utilization level of the physical processor that is representative of the first virtual processor.

17. The apparatus of claim 14, wherein the second factor is computed to be less than the first factor.

18. The apparatus of claim 14, wherein the processor is configured to compute the timeout period by:
multiplying the second factor and the second response time statistic.

19. The apparatus of claim 1, wherein the processor is configured to:
track a response time while waiting for receipt of the first processing response from the first virtual processor, wherein the timeout period is based on a value at which a probability that the response time will be greater than a response time statistic associated with a percentile of interest, given that the response time has already exceeded the timeout period, is greater than a probability that the response time will be less than the response time statistic associated with the percentile of interest.

20. The apparatus of claim 1, wherein the processor is configured to:
abort the processing request propagated toward the first virtual processor prior to propagating the processing request toward the second virtual processor.

21. A non-transitory computer-readable storage medium storing instructions which, when executed by a computer, cause the computer to perform a method, the method comprising:
propagating a processing request toward a first virtual processor hosted on a first hardware device; and
propagating the processing request toward a second virtual processor hosted on a second hardware device based on a determination that a timeout period associated with the first virtual processor expires before receipt of a first processing response from the first virtual processor responsive to the processing request, wherein the timeout period is based on at least one physical processor response time statistic, wherein the at least one physical processor response time statistic is associated with a physical processor that is representative of the first virtual processor.

22. A method, comprising:
using a processor and a memory for:
propagating a processing request toward a first virtual processor hosted on a first hardware device; and
propagating the processing request toward a second virtual processor hosted on a second hardware device based on a determination that a timeout period associated with the first virtual processor expires before receipt of a first processing response from the first virtual processor responsive to the processing request, wherein the timeout period is based on at least one physical processor response time statistic, wherein the at least one physical processor response time statistic is associated with a physical processor that is representative of the first virtual processor.

* * * * *